United States Patent
Laine et al.

(10) Patent No.: US 6,910,339 B2
(45) Date of Patent: Jun. 28, 2005

(54) METHOD AND SYSTEM FOR EXTRACTING AND DISPOSING OF WATER VAPOR CONTAINED IN THE AIR OF A SPACE VEHICLE

(75) Inventors: Robert Laine, Fourqueux (FR); Primo Tamburini, Mons (FR)

(73) Assignee: Agence Spatiale Europeenne, Paris (FR)

( * ) Notice: Subject to any disclaimer, the term of this patent is extended or adjusted under 35 U.S.C. 154(b) by 115 days.

(21) Appl. No.: 10/654,269

(22) Filed: Sep. 2, 2003

(65) Prior Publication Data

US 2004/0123607 A1 Jul. 1, 2004

(30) Foreign Application Priority Data

Sep. 3, 2002 (FR) .............................................. 02 10882

(51) Int. Cl.[7] .................. F25D 17/06; F25D 21/00; F25D 21/14; B01D 19/00; F28D 7/10
(52) U.S. Cl. .................. 62/93; 62/90; 62/272; 62/281; 62/285; 62/290; 96/174; 96/173; 165/110; 165/154; 422/122; 422/194; 55/160
(58) Field of Search ................. 62/93, 90, 272, 62/281, 290; 96/173, 174; 165/110, 154; 422/122, 194; 55/160

(56) References Cited

U.S. PATENT DOCUMENTS 3,257,780 A * 6/1966 Webb ........................... 96/174
3,362,468 A * 1/1968 Olson .......................... 165/110
3,457,040 A * 7/1969 Jennings ....................... 210/194
4,260,015 A    4/1981 Tamburini
4,412,851 A * 11/1983 Laine .......................... 96/173
4,707,166 A   11/1987 Khosropour
6,142,151 A   11/2000 Dean
6,418,743 B1 * 7/2002 Hauser et al. ................ 62/281

FOREIGN PATENT DOCUMENTS

EP          1 170 556 A1    1/2002
JP          11099998        4/1999
RU          2 165 380 C1    4/2001

* cited by examiner

Primary Examiner—Cheryl Tyler
Assistant Examiner—Filip Zec
(74) Attorney, Agent, or Firm—Epstein Drangel Bazerman & James, LLP.

(57) ABSTRACT

A system for extracting including a cooled condenser apparatus in contact with the volume of pressurized air being dehumidified, the condensed water being transferred into collection areas by means of capillary attraction; an evaporation chamber in thermal contact with the condenser apparatus having an inlet connected to the collection areas by means of a first valve device and an outlet connected by means of a second valve device to a space wherein the pressure is lower than that of the volume of pressurized air; and a control device for controlling the valve devices in order to carry out a control cycle with a first phase for placing the evaporation chamber under negative pressure in relation to the volume of pressurized air, and a second phase for suctioning the condensed water in the collection areas towards the decompression chamber, until the pressure in the decompression chamber reaches a predefined threshold.

14 Claims, 2 Drawing Sheets

METHOD AND SYSTEM FOR EXTRACTING AND DISPOSING OF WATER VAPOR CONTAINED IN THE AIR OF A SPACE VEHICLE

FIELD OF THE INVENTION

This invention relates to a system and method of extracting and disposing of water vapor contained in a volume of pressurized air.

It applies in particular, but not exclusively, to the pressure cabins of manned spacecraft, i.e., in the absence of gravity or in a microgravity environment. As a matter of fact, human beings or animals discharge water vapor continuously. When they live in a volume of pressurized air, it is necessary to extract the water vapor as they discharge it.

DESCRIPTION OF THE RELATED ART

Various systems have been developed to extract the water vapor from the air and to discharge it into space. However, these systems use electrical rotating machines such as compressors and centrifuges, which constitutes a major disadvantage for a manned spacecraft, due to the fact that these machines have a significant mass, are noisy, produce vibrations, and consume electrical energy.

Moreover, the Applicant has designed a condenser apparatus intended for use in heat transport systems in a zero gravity environment. This condenser, that is described in patent U.S. Pat. No. 4,260,015, includes cooled, cone-shaped fins, which are stacked so as to form narrow gaps therebetween, ensuring that the condensed liquid on the fins is transferred to a central collection pipe by means of capillary attraction. Next occurs the problem of extracting the liquid water held in the capillary areas and then that of discharging the water thus collected into space. As a matter of fact, the water tends to be converted into ice, when directly discharged into space in liquid form, and thus tends to obstruct the discharge pipe.

Patent Application EP 1 170 556 (or U.S. Ser. No. 2002/020182) describes a condenser wherein the condensed water is transported by means of capillary attraction to a suction area placed under negative pressure. This document does not provide a solution for discharging the water thus collected into space.

The Applicant has likewise designed a liquid/vapor phase separation system for a cryogenic plant, this system, described in Patent FR 2 500 908, includes a transfer chamber including an inlet connected to the cryogenic storage vessel and a gas discharge outlet, which are opened in an alternating manner by valve devices. The transfer chamber is maintained at a pressure and temperature such that the liquid penetrating into the chamber vaporizes prior to reaching the chamber outlet, which is at a pressure lower than that of the chamber. This solution involves the chamber being kept at a substantially constant temperature, i.e., to provide the energy necessary for the vaporization of the fluid.

SUMMARY OF THE INVENTION

The purpose of this invention is to eliminate these disadvantages and to propose an integrated solution making it possible to discharge the water collected in liquid form into space, while at the same time minimizing both the amount of air expelled with the discharged water and the electrical energy consumed. This objective is attained by providing a system for extracting and discharging water vapor contained in a volume of pressurized air, including a cooled condenser apparatus in contact with the volume of pressurized air, wherein the condensed water is transferred into collection areas by means of capillary attraction.

According to the invention, this system includes:

an evaporation device comprising a decompression chamber in thermal contact with the condenser apparatus, and having an inlet connected to the collection areas by means of a first valve device, and an outlet connected by means of a second valve device to a space wherein the pressure is lower than that of the volume of pressurized air, and means of controlling the valve devices in order to produce a control cycle comprising a first phase for opening and then closing the second valve device while the first valve device is closed, so as to place the decompression chamber under negative pressure in relation to the volume of pressurized air, and a second phase for opening the first valve device, while the second valve device is closed, so as to suction the condensed water in the collection areas of the condenser apparatus towards the decompression chamber, while the second valve device is closed, until the pressure in the decompression chamber reaches a predefined value.

The control means are advantageously designed to control the opening of the first valve device by successive impulses, during the second phase.

According to one characteristic of the invention, the condenser apparatus includes a stack of a plurality of fins forming condensation areas therebetween including condensation surfaces drawing closer together in the direction of the collection areas, so that the condensed water at the surface of the condensation areas is transferred to the collection areas by means of capillary attraction.

According to another characteristic of the invention, the decompression chamber is arranged inside a recess formed in each of the fins.

According to yet another characteristic of the invention, the decompression chamber includes means having a very large surface area in relation to their volume in order to trap all of the suspended drops of water before they reach the second valve device, these means being placed in thermal contact with the walls of the decompression chamber.

More preferably, the means having a very large surface area in relation to their volume consist of metal foam.

Alternatively, the means having a very large surface area in relation to their volume consist of a set of plates having a substantially identical shape, which are stacked one on top of the other and arranged inside the decompression chamber in thermal contact with the walls thereof, each of the plates including a central part that is thinner than its peripheral part in order to delimit spaces therebetween that are placed in communication with each other by way of perforations made in the plates, so as to form a labyrinth-like path between the inlet and outlet of the decompression chamber.

The outlet of the second valve device is advantageously connected to the space vacuum.

Preferably, the valve devices are solenoid valves operated by the control means.

According to another characteristic of the invention, this system includes a temperature sensor and a pressure sensor that are arranged so as to be able to measure, respectively, the prevailing temperature and pressure inside the decompression chamber, and that are connected to the control means, the control means further comprising means for adjusting the pressure inside the decompression chamber so that the temperature inside the decompression chamber is always situated between the dew point temperature and the melting temperature of the water.

According to yet another characteristic of the invention, this system also includes a water presence detector for detecting the presence of liquid water at the outlet of the collection areas of the condenser apparatus, the detector being connected to the control means, the control means further comprising means for keeping the first valve device closed as long as the water presence detector does not detect any liquid water.

Alternatively, the valve devices are mechanically operated valves, the operation of which is based on the differences in pressure between the space vacuum, the decompression chamber and the volume of pressurized air.

The invention likewise relates to a method of extracting and disposing of water vapor contained in a volume of pressurized air, comprising the steps of condensing the water vapor on a cooled condenser apparatus, and collecting the condensed water on the condenser apparatus by means of capillary attraction.

According to the invention, this method further comprises a cycle of steps consisting in:

placing a decompression chamber under negative pressure in relation to the volume of pressurized air, by opening a first valve device opening out into a space wherein the pressure is lower than that of the volume of pressurized air, the decompression chamber being in thermal contact with the condenser apparatus, then suctioning the water collected towards the decompression chamber, by opening a second valve device by successive impulses, while the first valve device is closed, and simultaneously measuring and comparing the pressure inside the decompression chamber with a predetermined threshold pressure, and restarting the cycle whenever the measured pressure is equal to or higher than the predetermined threshold pressure.

The threshold pressure is advantageously determined continuously or cyclically so as to be lower than the pressure prevailing in the volume of pressurized air, and so that the temperature inside the decompression chamber is always situated between the dew point temperature and the melting temperature of the water at the pressure prevailing inside the decompression chamber.

BRIEF DESCRIPTION OF THE DRAWINGS

One preferred embodiment of the invention will be described hereinbelow, as a non-limiting example, with reference to the appended drawings wherein.

DETAILED DESCRIPTION OF THE PREFERRED EMBODIMENTS

Figure 1:
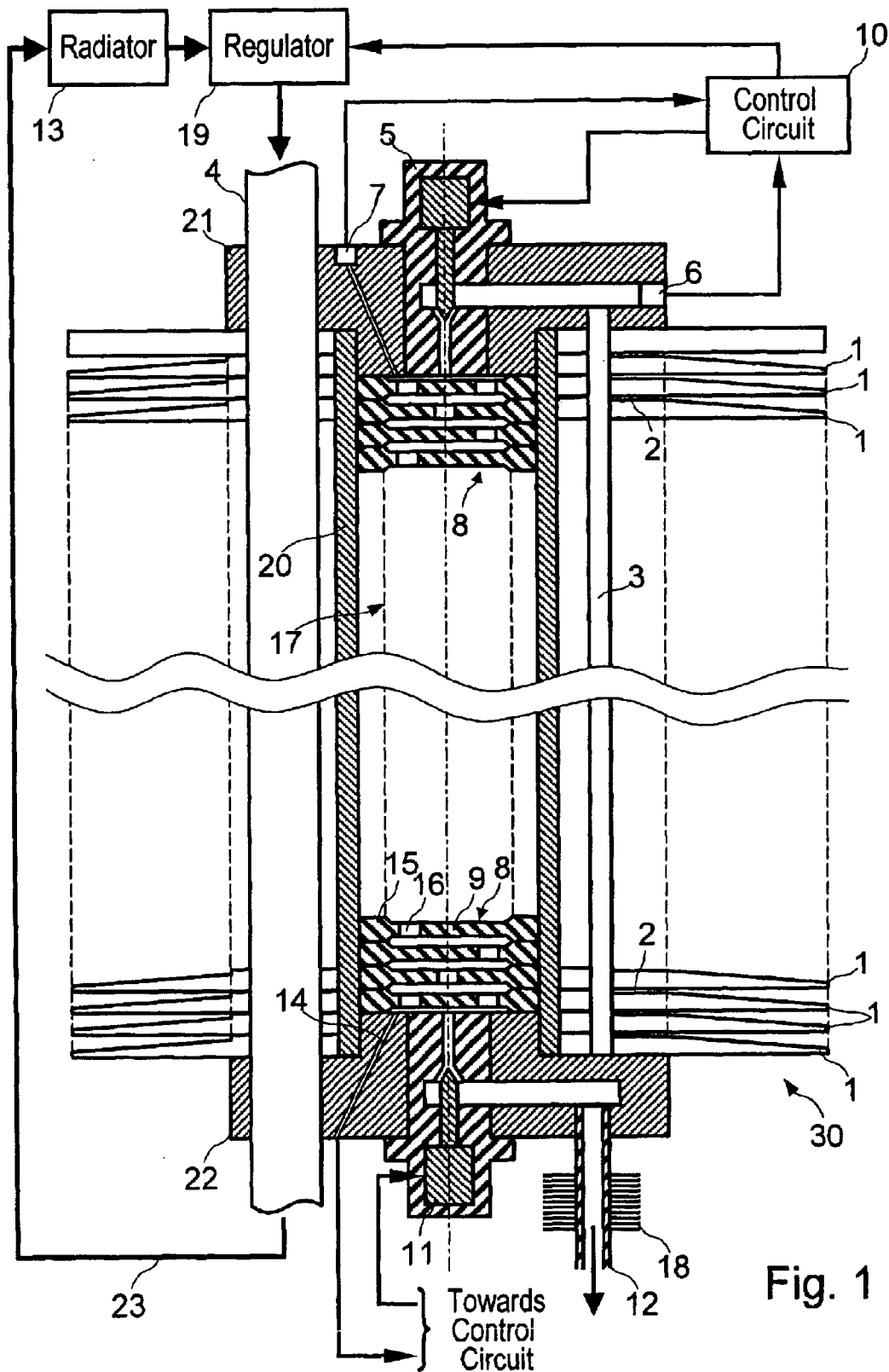
FIG. 1 is a schematic illustration of a cross-sectional view of a system according to the invention.
Figure 2:
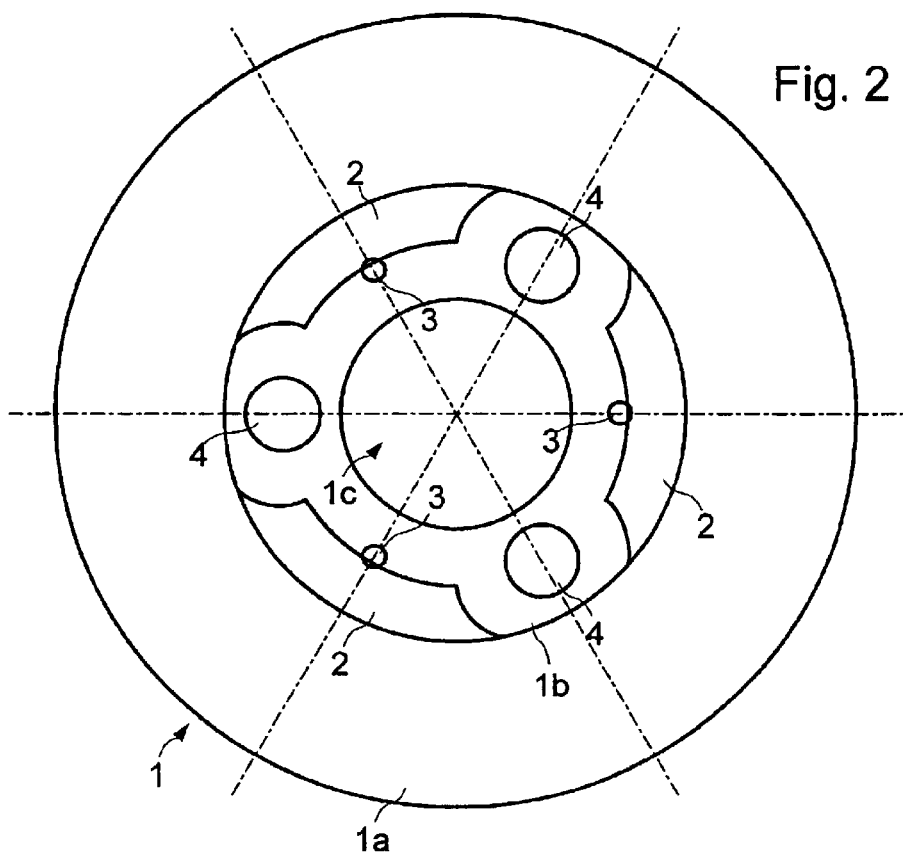
FIG. 2 shows an axial view of a fin of the device shown in FIG. 1.

In FIGS. 1 and 2, the system according to the invention includes a cooled device for condensing and collecting the water vapor contained in the air being dehumidified, coupled with a device for evaporating the collected water, which is connected to a discharge pipe 12 for the collected water vapor, said pipe opening out, for example, into space.

The condenser and collector apparatus includes a stack of a plurality of fins 1 having a substantially identical, thin truncated cone shape comprising a truncated cone-shaped peripheral part 1a and a substantially planar central part. The central part of each fin includes at least one perforation forming a collection pipe 3 for the condensed water, at least one perforation for the passage of a heat pipe 4, and at least one planar collection area 2, parallel to the central part 1b, and which is slightly recessed in relation thereto, so as to form a space capable of receiving and holding the condensed water by means of capillary attraction, this collection area being in communication with the collection pipe 3.

The heat pipe or pipes 4 are thermally connected to a cold radiator 13, situated, for example, outside the spacecraft. The heat pipes and the radiator are, for example, part of a circuit 23 wherein a heat transfer fluid is circulated.

The number of heat pipes 4 and the shape and dimensions of the cold radiator 13 are advantageously selected so that the temperature of the fins 1 in thermal contact with the heat pipes 4 ranges between those of the dew point of the water vapor of the cabin being dehumidified and the melting point of the water at the pressure prevailing inside the cabin. In this way, the water vapor contained in the air condenses on the fins without being converted into ice.

The taper of the part 1a and the depth of the recess of the collection area 2 (i.e., the difference in thickness between the central area and the collection area) are selected so as to ensure that the condensed water is transferred by means of capillary attraction onto the cone-shaped part 1a and onto the face of the adjacent fin opposite thereto, towards the collection areas 2 in communication with the collection pipe 3. The spacing between the condensation surfaces of the fins varies, for example, by approximately 1 mm along their periphery to 0.25 mm at the level of the collection surfaces 2.

As shown in FIG. 2, each fin, for example, has three axes of symmetry within its plane, the number of heat pipes 4 and collection pipes 3 thus being equal to three. Of course, this number may assume any other value, and the numbers of heat pipes and collection pipes selected may differ one from the other, without thereby exceeding the scope of this invention.

The evaporation device includes a decompression chamber 17 connected to one end of the collection pipe 3 by means of a first valve device 5, and at the other end, to the pipe 12 for discharging into space, by means of a second valve device 11. The valve devices 5, 11, for example, consist respectively of solenoid valves operated by a control circuit 10.

In addition, the decompression chamber 17 has a very large internal surface area so as to trap the suspended drops of liquid water, while at the same time preventing the direct transfer of the droplets from the inlet to the outlet. To this end, the decompression chamber may be filled with metal foam in thermal contact with its walls 20. Alternatively, as shown in FIG. 1, the decompression chamber is filled with a plurality of disks 8 stacked one on top of the other and in thermal contact with its walls 20. Each disk 8 has a circumferential area 15 thicker than its central area 9, which comprises at least one perforation 16, the respective perforations of the disks 8 being offset in relation to each other. In this way, the stack of disks 8 forms a labyrinth-like passage for the collected water, consisting of the spaces situated between the central areas 9 of the disks 8 and the perforations 16 which interconnect these spaces with each other. The number of disks and the thickness of the central part of the disks 15, as well as the diameter and number of perforations 16 in each disk, are selected so as to maximize the contact surface of the decompression chamber 17.

Each fin is advantageously equipped with a central recess 1c, and the decompression chamber 17 is arranged inside the space delimited by the recesses 1c of the stacked fins 1, which, on the one hand, makes it possible to reduce the overall dimensions of the system and, on the other hand, to place these elements in thermal contact with the fins.

In order to effectively control the valve devices 5, 11, the control circuit 10 is also connected to a pressure sensor 7 and to a temperature sensor 14, arranged inside the decompression chamber 17, in order to measure, respectively, the pressure and temperature therein.

Figure 3:
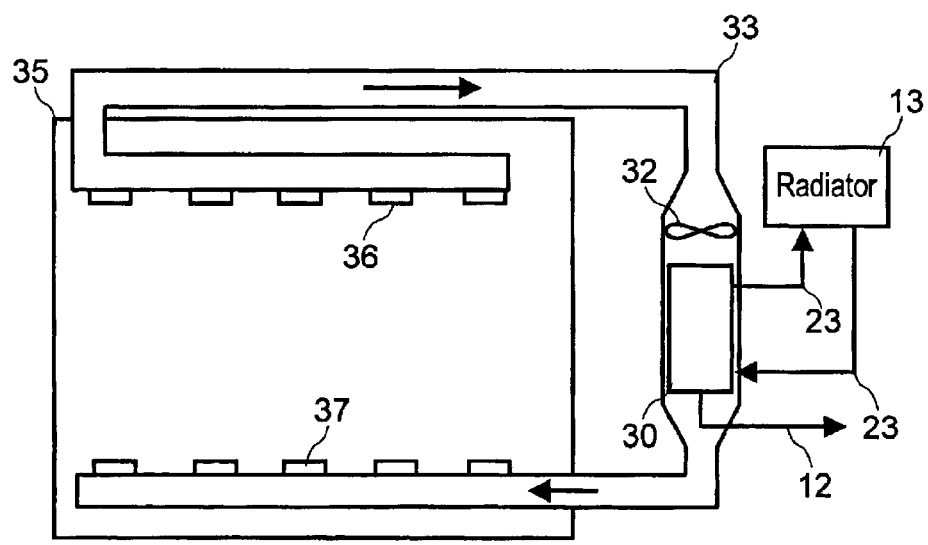
FIG. 3 is a schematic illustration of the system shown in FIG. 1, arranged in a ventilation system of a pressure cabin.

The system just described functions in the following way. The system is cooled passively by the heat pipe or pipes, while the air of the cabin being dehumidified circulates over the fins 1 which are cooled. To this end, as shown in FIG. 3, the system 30 according to the invention may be placed inside an air distribution duct 33 of the cabin 35 being dehumidified, e.g., close to a fan 32, the duct 33 opening out into the cabin by way of moist air suction openings 36 and dry air recirculation openings 37.

Consequently, the water vapor contained in the air condenses inside the cone-shaped spaces situated between the surfaces of the fins in contact with the air, and flows in the direction of the collection areas 2 by means of capillary attraction.

During this time, the valve device 11 is opened to create a vacuum in the decompression chamber 17, then closed. Next, the valve device 5 is opened by successive impulses so as to suction the water that has been condensed and transferred by means of capillary attraction into the collection areas 2, towards the collection pipe 3, then into the decompression chamber placed under negative pressure in relation to the air of the cabin. Due to the large contact surface of the decompression chamber 17, the suspended water drops coming from the collection pipe 3 are deposited on the walls of the disks 8, without being able to reach the outlet of the decompression chamber, and evaporate at a constant temperature. Consequently, the pressure inside the chamber increases. Whenever this pressure measured by the pressure sensor 7 reaches a predefined threshold such that the evaporation of the water inside the decompression chamber is complete, the control circuit opens the valve device 11 while the valve device 5 is closed, so as to discharge the water vapor contained in the decompression chamber 17 and recreate a vacuum therein in order to start another operating cycle. Under no circumstances should both valve devices 5, 11 be open at the same time.

The threshold pressure is preferably calculated continuously or cyclically, depending on the pressure and temperature measured, respectively, by the pressure and temperature sensors, so that the temperature of the decompression chamber is always situated between the dew point and the melting point of the water ice, and so that the pressure of the decompression chamber is always lower than the pressure of the air inside the cabin and sufficiently low to ensure the complete evaporation of the water, the dew point and melting point being dependent on the pressure prevailing inside the decompression chamber. To this end, the control circuit 10 has tables providing the respective temperatures of the dew point and melting point of the water with respect to the pressure, for the range of operating pressures of the system.

A water presence detector 6 is advantageously provided, arranged, for example, in the collection pipe 3 and connected to the control circuit 10 in order to keep the valve device 5 closed if a sufficient amount of water has not been collected, and to thus avoid discharging dry air into space, or else in order to trigger the sending of an impulse for opening the valve device 5 only when water is detected.

Furthermore, in order to prevent the formation of ice inside the discharge pipe 12, it is also possible to provide a heat exchanger 18, e.g., with the warm air from the cabin, in order to raise the temperature of the water vapor before it is ejected into space.

The condenser apparatus and evaporation device assembly can be advantageously assembled by means of a tube 20, for example a cylindrical tube, inserted into the recesses 1c of the fins 1 which, in this case, are circular, so as to maintain said fins in a stacked configuration, the assembly being made integral by two plugs 21, 22 closing the opposite openings of the tube 20 and keeping the fins clamped together. The plugs are also designed, on the one hand, to place in communication the collection pipe or pipes 3 with the decompression chamber 17 and, respectively, the decompression chamber with the pipe 12 and, on the other hand, to house the valve devices 5 and 11, respectively.

Therefore, the system just described does not comprise any rotating machine. In fact, the energy required to operate the system (apart from that required to actuate the solenoid valves 5, 11) is supplied by the difference in pressure and temperature between the cabin being dehumidified and the space vacuum. Therefore, this system has the advantage of being very economical. It may be noted also that the efficiency of the system according to the invention stems from the fact that the heat produced by the condensation of the water on the fins 1 is absorbed by the evaporation of the water inside the decompression chamber which is in thermal contact with the fins.

It is likewise to be noted that the system just described also acts as a heat exchanger and can be used to cool the air of the cabin being dehumidified. The number of fins, the dimensions thereof, as well as the number of heat pipes can also be selected with respect to the thermal power to be dissipated.

It is also possible to provide a device 19 to regulate the temperature of the heat pipes 4 that is inserted into the circuit 23, the temperature setting of which is controlled by the control circuit 10 in order to adjust the temperature of the condenser apparatus with respect to the desired degree of humidity and temperature inside the cabin. It is to be noted that the heat pipes may consist of the coolant fluid and thermal control loops existing on certain spacecraft.

In one simplified embodiment of the system according to the invention, the valve devices 5, 11 are mechanically operated valves, the operation of which is based on the differences in pressure between the decompression chamber 17 and the cabin being dehumidified, and between the space vacuum and the decompression chamber, respectively. In this embodiment, the control circuit 10 and the pressure 7, temperature 14 and water presence 6 sensors are not necessary.

What is claimed is:

1. A system for extracting and discharging water vapor contained in a volume of pressurized air, comprising:
   a cooled condensation device in contact with the volume of pressurized air, wherein condensed water is transferred into collection areas by means of capillary attraction,
   an evaporation device comprising a decompression chamber in thermal contact with the condensation device, and having an inlet connected to the collection areas by means of a first valve device, and an outlet connected by means of a second valve device to a space wherein pressure is lower than that of the volume of pressurized air, and control means for controlling the first and second valve devices according to a control cycle comprising a first phase of opening and then closing the second valve device whereas the first valve device is closed, so as to place the decompression chamber under negative pressure in relation to the volume of pressurized air, and a second phase of opening the first valve device, whereas the second valve device is closed, so as to suction the condensed water in the collection areas of the condensation device towards the decompression chamber, until the pressure in the decompression chamber reaches a predefined value.

2. The system as claimed in claim 1, wherein the control means are designed to control the opening of the first valve device by successive impulses, during the second phase.

3. The System as claimed in claim 2, wherein the condensation device comprises a stack of a plurality of fins forming condensation areas therebetween including condensation surfaces drawing closer together in the direction of the collection areas, so that the condensed water at the surface of the condensation areas is transferred to the collection areas by means of capillary attraction.

4. The system as claimed in claim 3, wherein the decompression chamber is arranged inside a recess formed in each of the fins.

5. The System as claimed in claim 1, wherein the decompression chamber includes means having a very large surface area in relation to their volume in order to trap suspended drops of water before they reach the second valve device, said means being placed in thermal contact with walls of the decompression chamber.

6. The System as claimed in claim 5, wherein the means having a very large surface area in relation to their volume consist of metal foam.

7. The System as claimed in claim 5, wherein the means having a very large surface area in relation to their volume consist of a set of plates having a substantially identical shape, which are stacked one on top of the other and arranged inside the decompression chamber in thermal contact with walls thereof, each of the plates including a central part that is thinner than a peripheral part in order to delimit spaces therebetween that are placed in communication with each other by way of perforations made in the plates, so as to form a labyrinth-like path between the inlet and outlet of the decompression chamber.

8. The system as claimed in claim 1, wherein the outlet of the second valve device is connected to a space vacuum.

9. The system as claimed in claim 1, wherein said first and second valve devices are solenoid valves operated by the control means.

10. The system as claimed in claim 1, further comprising a temperature sensor and a pressure sensor that are arranged so as to be able to measure, respectively, temperature and pressure inside the decompression chamber, and that are connected to the control means, the control means further including means for adjusting the pressure inside the decompression chamber so that the temperature inside the decompression chamber is always situated between a dew point temperature and a melting temperature of water.

11. The system as claimed in claim 1, further comprising a water presence detector for detecting the presence of liquid water at the outlet of the collection areas of the condensation device, the water presence detector being connected to the control means, the control means further comprising means for keeping the first valve device closed as long as the water presence detector does not detect any liquid water.

12. The system as claimed in claim 1, wherein the first and second valve devices are mechanically operated valves, and are operated as a function of differences in pressure between a space vacuum, the decompression chamber and the volume of pressurized air.

13. A method for extracting and disposing of water vapor contained in a volume of pressurized air, comprising:

a step of condensing the water vapor on a cooled condensation device, and collecting the condensed water on the condensation device by means of capillary attraction, and a succession of operation cycles each comprising the steps of:
(i) placing a decompression chamber under negative pressure in relation to the volume of pressurized air, by opening a first valve device opening out into a space wherein the pressure is lower than that of the volume of pressurized air, the decompression chamber being in thermal contact with the condensation device,
(ii) suctioning water collected by the condensation device towards the decompression chamber, by opening a second valve device by successive impulses, whereas the first valve device is closed, and simultaneously measuring and comparing the pressure inside the decompression chamber with a predetermined threshold pressure, and
(iii) starting a new operation cycle whenever the measured pressure is equal to or higher than the predetermined threshold pressure.

14. The method as claimed in claim 13, wherein the threshold pressure is determined continuously or cyclically so as to be lower than the pressure in the volume of pressurized air, and so that the temperature inside the decompression chamber is always situated between a dew point temperature and a melting temperature of the water at the pressure inside the decompression chamber.

* * * * *